United States Patent [19]

Aoki et al.

[11] Patent Number: 4,993,034
[45] Date of Patent: Feb. 12, 1991

[54] OPTICAL WAVEGUIDE LASER AND A MEDIUM FOR USE IN THE OPTICAL WAVEGUIDE LASER

[75] Inventors: Hiroshi Aoki, Kanagawa; Osamu Maruyama, Tokyo, both of Japan

[73] Assignee: Hoya Corporation, Japan

[21] Appl. No.: 536,785

[22] Filed: Jun. 12, 1990

[30] Foreign Application Priority Data

Mar. 30, 1990 [JP] Japan ................................. 2-86142

[51] Int. Cl.$^5$ ............................................... H01S 3/17
[52] U.S. Cl. ............................................ 372/40; 372/7
[58] Field of Search .............................. 372/6, 7, 40; 350/96.12

[56] References Cited

U.S. PATENT DOCUMENTS

4,075,120 2/1978 Myers et al. ...................... 372/40 X
4,849,036 7/1989 Powell et al. ..................... 372/40 X Primary Examiner—Frank Gonzalez
Assistant Examiner—Galen J. Hansen
Attorney, Agent, or Firm—Oliff & Berridge

[57] ABSTRACT

A waveguide laser medium having an optical waveguide, which is used for effecting light amplification or laser oscillation and is formed by performing the ion exchange of alkaline ions contained in a predetermined portion of a laser glass substrate, which includes the alkaline ions and laser active ions, for another kind of ions, which operate to increase the refractive index of the laser glass, thereby making the refractive index of the predetermined portion become higher than that of the other portions of the laser glass substrate. Further, the laser glass substrate is made of, for example, phosphate glass containing neodymium ions as the laser active ions and further containing 0.01∼8.0 mol % of $Na_2O$, from which $Na^+$ ions are obtained as the alkaline ions, and the ion operating to increase the refractive index of the predetermined portion is $Ag^+$ ions. Such a waveguide laser medium is employed in a waveguide laser. Thereby, the ion exchange can be efficiently performed without the occurrence of a crack in the laser glass substrate and so on. Furthermore, light amplification, as well as laser oscillation, can be efficiently performed.

12 Claims, 8 Drawing Sheets

OPTICAL WAVEGUIDE LASER AND A MEDIUM FOR USE IN THE OPTICAL WAVEGUIDE LASER

BACKGROUND OF THE INVENTION

1. Field of the Invention

The present invention relates to a laser medium for use in an optical waveguide laser (hereunder sometimes referred to as a waveguide laser medium) which performs light amplification or laser oscillation by using an optical waveguide containing active material and to an optical waveguide laser (hereunder sometimes referred to simply as a waveguide laser) employing the waveguide laser medium.

2. Description of the Related Art

As examples of a conventional waveguide laser medium and a conventional waveguide laser, are known the waveguide laser medium and the waveguide laser which are previously proposed by applicants of the instant application (see Japanese Unexamined Patent Publication (Kokai Tokkyo Koho) No. 63-29986).

The previously proposed waveguide laser medium and waveguide laser are adapted to effect light amplification or optical oscillation by irradiating pump light into a waveguide which contains active ions and is formed in a substrate.

Further, the previously proposed waveguide laser medium and waveguide laser are obtained by forming a portion having a high refractive index as an optical waveguide by performing ion exchange on a part of a glass substrate made of glass (hereunder sometimes referred to as laser glass) containing active ions. Namely, alkaline ions (hereunder sometimes referred to as A-ions) contained in the laser glass are exchanged for ions of another kind (hereunder sometimes referred to as B-ions) which can increase the refractive index of the laser glass. Thereby, a portion, in which the A-ions are exchanged for the B-ions, comes to have a high refractive index and thus becomes an optical waveguide.

Further, it is necessary for obtaining a waveguide laser medium and waveguide laser having desired performance to meet the following conditions ①, ② and ③:

① The ion exchange of A-ions for B-ions can be efficiently performed in a sufficiently short time.

② The ionic radius of an A-ion is nearly equal to that of a B-ion in such a manner to prevent occurrence of a crack in the substrate at the time of the ion exchange or of distortion of the substrate after the ion exchange.

③ The ion exchange should be effected in such a manner not to deteriorate the characteristics of the waveguide laser.

Subsequent research reveals that it is necessary for satisfying the foregoing requirements ①, ② and ③ to carefully select kinds and quantities of the A-ion and the B-ion and a sort of laser glass. The present invention is accomplished to resolve such a problem.

It is therefore an object of the present invention to provide a waveguide laser medium, in which the ion exchange can be efficiently performed without the occurence of a crack and furthermore light amplification, as well as laser oscillation, can be efficiently performed, and a waveguide laser using such a waveguide laser medium.

SUMMARY OF THE INVENTION

To achieve the foregoing object and in accordance with a first aspect of the present invention, there is provided a waveguide laser medium having an optical waveguide, which is used for effecting light amplification or laser oscillation and is formed by performing the ion exchange of alkaline ions contained in a predetermined portion of a laser glass substrate, which includes the alkaline ions and laser active ions, for another kind of ions, which operate to increase the refractive index of the laser glass, thereby making the refractive index of the predetermined portion become higher than that of the other portions of the laser glass substrate, wherein the laser glass substrate is made of phosphate glass containing neodymium ions as the laser active ions and further containing $0.01 \sim 8.0$ mol % of $Na_2O$, from which $Na^+$ ions are obtained as the alkaline ions, and the ions operating to increase the refractive index of the predetermined portion are $Ag^+$ ions.

Thus, $Na^+$ ions deriving from $Na_2O$ contained in the predetermined portion of the laser glass substrate are exchanged for $Ag^+$. This results in that the refractive index of the predetermined portion of the laser glass substrate becomes higher than that of the rest of the laser glass substrate and thus an optical waveguide is formed in the predetermined portion. The thus formed optical waveguide contains $Nd^{3+}$ ions as the laser active ions. Therefore, light amplification or laser oscillation can be performed by using this optical waveguide.

Here, note that the ion radius of $Na^+$ ion is close to that of $Ag^+$ ion. Thus, the ion exchange of $Na^+$ for $Ag^+$ can be effected efficiently and smoothly. Further, the occurrence of a crack in the substrate at the time of the ion exchange and the distortion of the substrate after the ion exchange can be effectively prevented. Namely, the thus formed optical waveguide is uniform in physical structure.

Additionally, $Ag^+$ ions contained in the thus formed optical waveguide in place of $Na^+$ ions do not deteriorate the characteristics of the waveguide laser when light amplification or laser oscillation is performed in this optical waveguide containing $Nd^{3+}$ ions as the active ions.

Incidentally, the reason why the mol % of $Na_2O$ to be contained in the laser glass substrate ranges from 0.01 to 8.0 is as follows.

In case where the mol % of $Na_2O$ is less than 0.01, the ion exchange of $Na^+$ for $Ag^+$ becomes hard to occur. Even if occurs, the difference in refractive index between the predetermined portion, in which the ion exchange of $Na^+$ for $Ag^+$ occurs, and the rest of the laser glass substrate cannot be large to the extent sufficient to form an optical waveguide.

In contrast, in case where the mol % of $Na_2O$ exceeds 8.0, chemical durability of the glass substrate becomes deteriorated. Further, an excess of exchanged $Ag^+$ ions occurs, thereby generating silver colloid. This results in increase of transmission loss of the optical waveguide.

Moreover, in accordance with a second aspect of the present invention, there is provided a waveguide laser medium having an optical waveguide, which is used for effecting light amplification or laser oscillation and is formed by performing the ion exchange of alkaline ions contained in a predetermined portion of a laser glass substrate, which includes the alkaline ions and laser active ions, for another kind of ions, which operate to increase the refractive index of the laser glass, thereby making the refractive index of the predetermined portion become higher than that of the other portions of the laser glass substrate, wherein the laser glass substrate is made of phosphate glass containing neodymium ions as the laser active ions and further containing 0.01~18.0 mol % of $K_2O$, from which $K^+$ ions are obtained as the alkaline ions, and the ions operating to increase the refractive index of the predetermined portion are $Cs^+$ ions.

Thereby, can be obtained similar technical effects or advantages as derived from the waveguide laser medium according to the first aspect of the present invention.

Incidentally, the reason why the mol % of $K_2O$ to be contained in the laser glass substrate ranges from 0.01 to 18.0 is as follows.

In case where the mol % of $K_2O$ is less than 0.01, the ion exchange of $K^+$ for $Cs^+$ becomes hard to occur. Even if occurs, the difference in refractive index between the predetermined portion, in which the ion exchange of $K^+$ for $Cs^+$ occurs, and the rest of the glass substrate cannot be large to the extent sufficient to form an optical waveguide.

In contrast, in case where the mol % of $K_2O$ exceeds 18.0, chemical durability of the glass substrate becomes deteriorated. Further, a quantity of $K^+$ ions exchanged for $Cs^+$ ions becomes in excess of a desirable one. This results in occurrence of a crack in the substrate.

Additionally, in case of the waveguide laser medium according to the present invention, the mol % of $P_2O_5$ contained in the phosphate glass is preferably in the range from 35.0 to 75.0. This is because of the facts that the glass is liable to crystallize if the mol % of $P_2O_5$ is less than 35.0 and that the chemical durability of the glass becomes deteriorated if the mol % of $P_2O_5$ exceeds 75.0. Moreover, the wt. % of neodymium ion contained in the phosphate glass is preferably in the range from 0.05 to 8.0. This is because of the facts that the laser oscillation is hard to occur if the wt. % of neodymium ion is less than 0.05 and that concentration quenching occurs if the wt. % of neodymium ion exceeds 8.0.

Furthermore, in accordance with a third aspect of the present invention, there is provided a waveguide laser which performs light amplification or laser oscillation by making pump light from a pump source impinge on a waveguide laser medium according to the first or second aspect of the present invention.

Thereby, is realized a waveguide laser which can be formed together with another optical integrated circuit on a substrate.

Thus, are realized a waveguide laser medium, in which the ion exchange can be efficiently performed without the occurrence of a crack and furthermore light amplification, as well as laser oscillation, can be efficiently performed, and a waveguide laser using such a waveguide laser medium.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring the accompanying drawings.

Referring first to FIGS. 1 through 5, the first embodiment of the present invention will be described hereinbelow.

Figure 1:
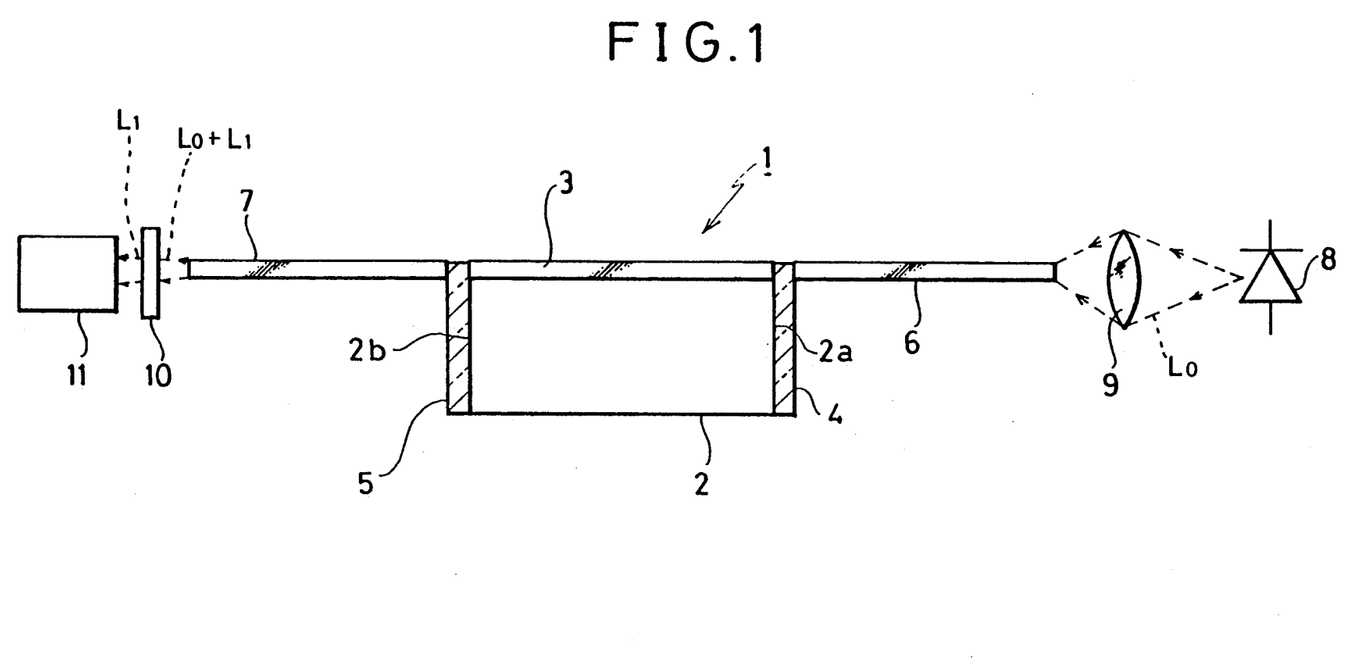
FIG. 1 is a schematic illustration for showing the whole construction of a waveguide laser embodying the present invention (hereunder sometimes referred to as a first embodiment)

In FIG. 1, reference numeral 1 denotes a waveguide laser medium; 2 a laser glass substrate; 3 an optical waveguide formed in a surface portion of the laser glass substrate 2; 4 a first highly reflecting mirror formed at one end of the optical waveguide 3; 5 a second highly reflecting mirror provided at the other end of the optical waveguide 3; 6 an optical fiber for leading pump light to the end, at which the first highly reflecting mirror 4 is provided, of the optical waveguide 3; 7 another optical fiber for guiding light emitted by laser oscillation (hereunder sometimes referred to simply as laser oscillation light) from the other end, at which the second highly reflecting mirror 5 is provided, of the optical waveguide 3 to the outside thereof; 8 a laser diode (LD) to be used as a pump source; 9 a convergent lens for focusing pump light emitted from the LD 8 into the optical fiber 6; 10 a filter; and 11 an optical power meter.

Figure 2:
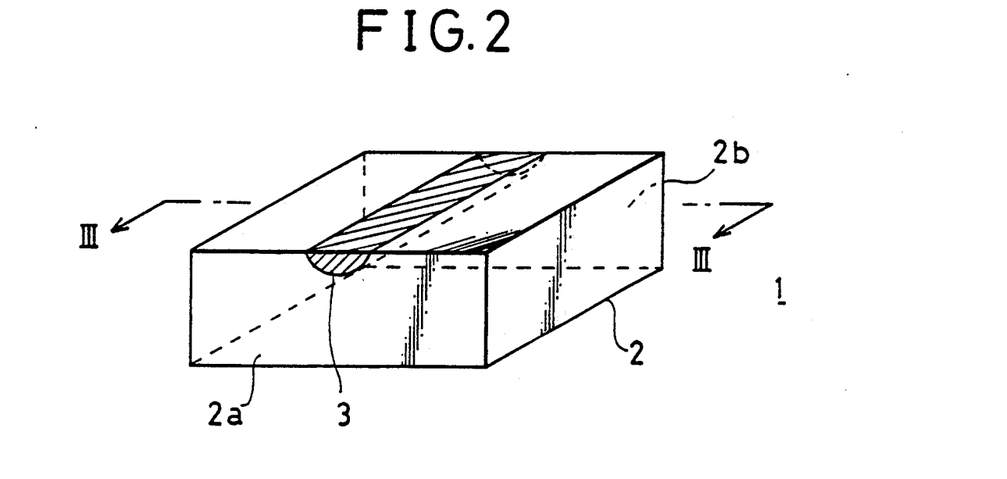
FIG. 2 is a perspective view of a waveguide laser medium employed in the waveguide laser of FIG. 1.

As illustrated in FIG. 2, the waveguide laser medium 1 is provided with the optical waveguide 3 which is formed in the surface portion of the laser glass substrate 2 and has a almost semicircular transverse section.

Further, the laser glass substrate 2 is made of phosphate glass containing 1 wt. % of neodymium (Nd) ion as the laser active ion. Incidentally, principal composing compounds of the laser glass substrate and the mol % of them are as follows.

$P_2O_5$: 75 mol %;
$Al_2O_3$: 5 mol %;
$Y_2O_3$: 5 mol %; and
$Na_2O$ : 3 mol %.

Additionally, the laser glass substrate 2 is 30 millimeters (mm) in width, 5 mm in length and 3 mm in thickness.

Moreover, as shown in FIG. 2, the optical waveguide 3 is formed like a semicircular cylinder, which extends in the longitudinal direction and is 5 mm in length, between one end surface 2a of the laser glass substrate 2 and the other end surface 2b thereof. Furthermore, the radius of the transverse section of the optical waveguide 3 is 90 microns ($\mu$m).

Further, this optical waveguide 3 is formed by performing the ion exchange of $Na^+$ ions, which are derived from $Na_2O$ contained in the laser glass substrate 2, for $Ag^+$ ions.

Figure 3:
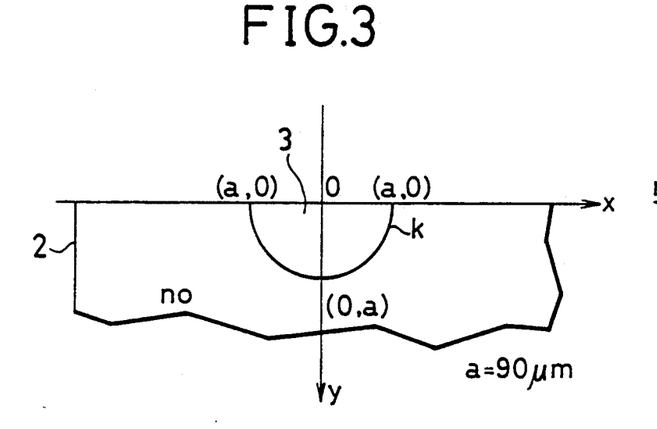
FIG. 3 is a cross-sectional view taken on line III—III of FIG. 2.

Turning to FIG. 3, there is shown the transverse section of the optical waveguide 3. In this figure, the x-axis is drawn in the top surface of the laser glass substrate 2 in the transverse direction perpendicular to the longitudinal direction of the optical waveguide 3. Further, the y-axis is drawn in the drawing paper in the direction perpendicular to the x-axis in such a manner to pass through the center point O of the optical waveguide 3. In such a case, the refractive index of the optical waveguide 3 varies in the x- and y-directions as respectively illustrated in FIGS. 4 and 5. Incidentally, in a graph of FIG. 4, the vertical axis represents the y-distances; and the horizontal axis the refractive index n of the optical waveguide 3. In contrast, in a graph of FIG. 5, the horizontal axis represents the x-distances; and the vertical horizontal axis the refractive index n of the optical waveguide 3.

Figure 4:
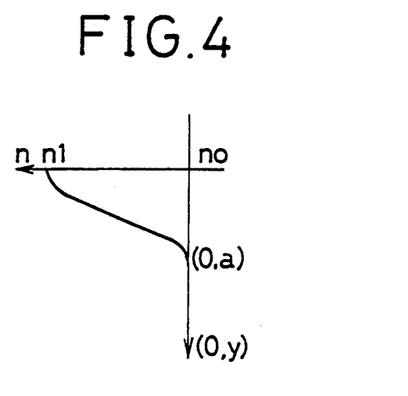
FIG. 4 is a graph for illustrating the distribution of refractive index of the waveguide laser medium in the y-direction of FIG. 3.
Figure 5:
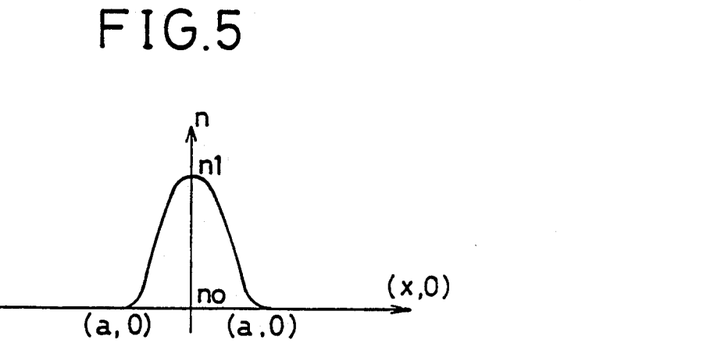
FIG. 5 is a graph for illustrating distribution of the refractive index of the waveguide laser medium in the x-direction of FIG. 3.

As shown in these graphs, the refractive index of the optical waveguide 3 is equal to $n_1$ at the center point O thereof. Further, the more distant from the center point O a point, at which the refractive index is measured, in the optical waveguide 3 becomes, the value of the refractive index n at the point decreases. Finally, in the vicinity of a borderline k, of which the distance from the center point O is a, the value of the refractive index n becomes nearly equal to that of the refractive index $n_o$ of the laser glass substrate 2.

Therefore, the light led into the optical waveguide 3 is confined and travels in the optical waveguide 3 according to a principle similar to the principle well-known in the technical field of optical fibers.

This optical waveguide 3 is formed in the following manner.

First, a Ti film having a thickness of several $\mu$m is formed on a surface of the laser glass substrate 2. Incidentally, this Ti film can be formed by using well-known film-deposition techniques (e.g., evaporation and sputtering).

Next, a part, which corresponds to a pattern of the optical waveguide 3 to be formed, of this Ti film is removed to expose the surface of the laser glass substrate 2 corresponding to the pattern which is 10 $\mu$m or so in width. This processing can be performed by employing well-known technique (e.g., photolithography).

Subsequently, by using Ti film as a mask, Ag film, which is several $\mu$m in thickness, is formed on the mask. Namely, Ag film is formed on the surface of the laser glass substrate 2 in line with the pattern of the optical waveguide 3. Incidentally, this Ag film can be also formed by using well-known film-deposition techniques (e.g., evaporation and sputtering).

Thereafter, this laser glass substrate 2 is heated to 400° C. in an electric furnace. Further, with the laser glass substrate 2 held at 400° C., an electric voltage of 6 volts is applied to the substrate 2 by using the Ag film as a positive electrode and also using the opposite surface of the substrate as a negative electrode. Consequently, $Na^+$ ions contained in the vicinity of a portion, which is in contact with the Ag film, of the surface of the substrate 2 are exchanged with $Ag^+$ ions which are then diffused and implanted in the substrate 2.

The Ti and Ag films are removed afterward if necessary.

Incidentally, as a method for fabricating the optical waveguide 3 other than the immediately above described process, can be employed, e.g., what is called a spontaneous diffusion method (see Japanese Unexamined Patent Publication No. 58-167453), a wet type electric-field applying implantation method (see Japanese Unexamined Patent Publication No. 58-167453) or a dry type electric-field applying implantation method (see Appl. Phys. Lett., Vol. 51, No. 5).

Figure 6:
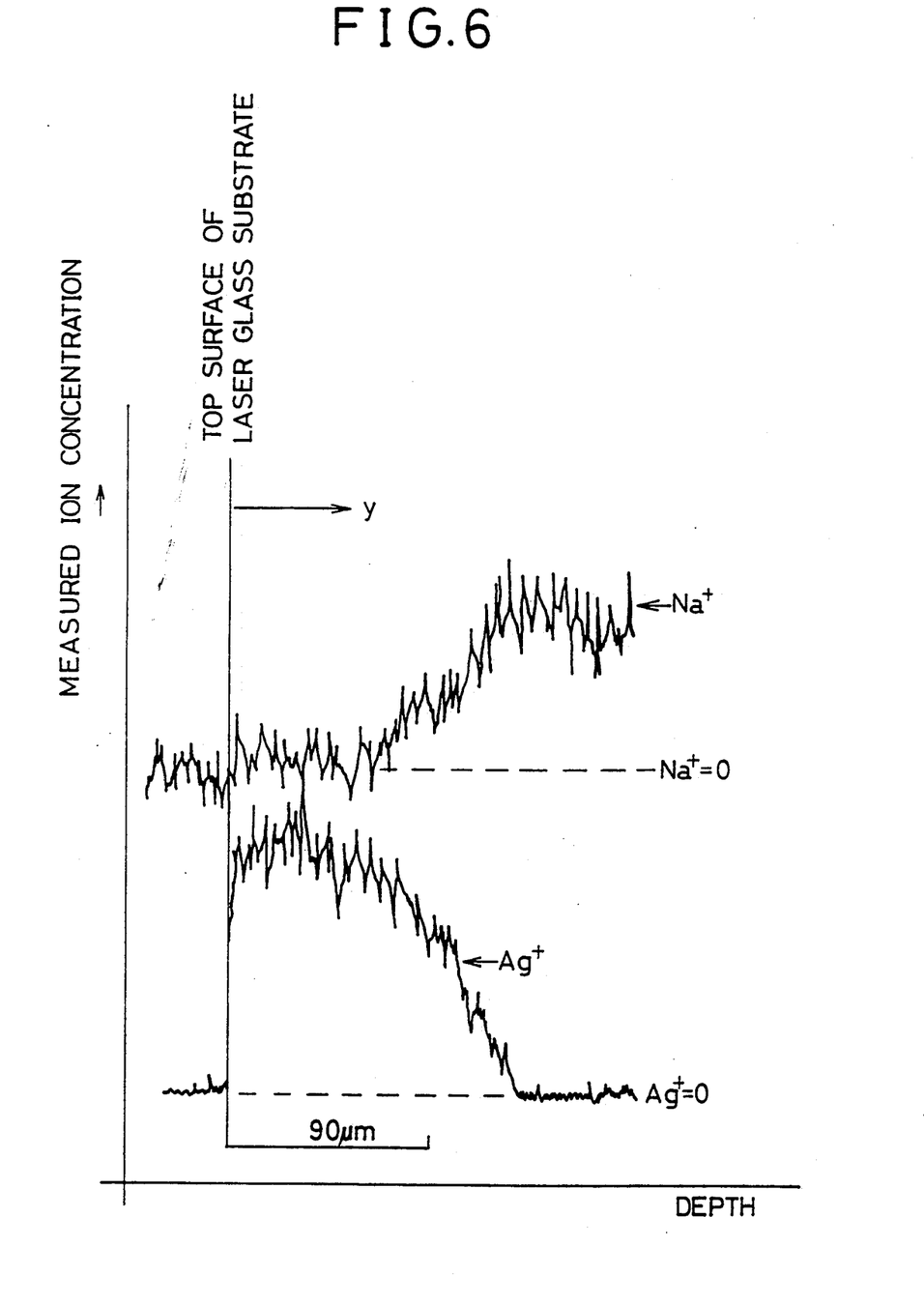
FIG. 6 is a graph for illustrating the results of measurement of distribution of ion concentration in the optical waveguide in the y-direction of FIG. 3.

Turning to FIG. 6, there is illustrated the results of measurement of distribution of ion concentration in the optical waveguide in the y-direction of FIG. 3. Incidentally, the measurement is practically effected by performing an electron probe microanalysis (EPMA) process. Further, in this graph, the horizontal axis represents the distance or depth from the top surface of the laser glass substrate 2; and the vertical axis the measured ion concentration.

Figure 7:
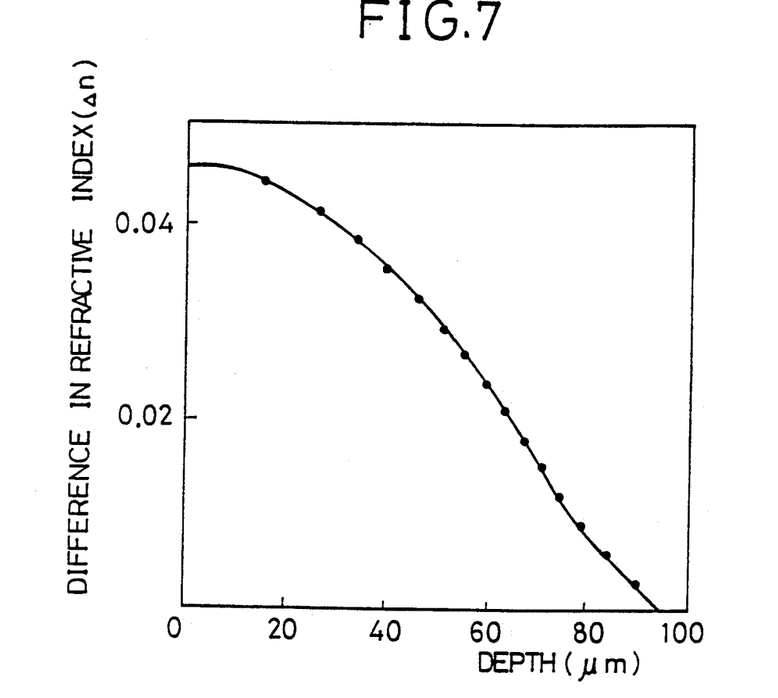
FIG. 7 is a graph for illustrating the results of measurement of distribution of the refractive index in the optical waveguide in the y-direction of FIG. 3.
Figure 8A:
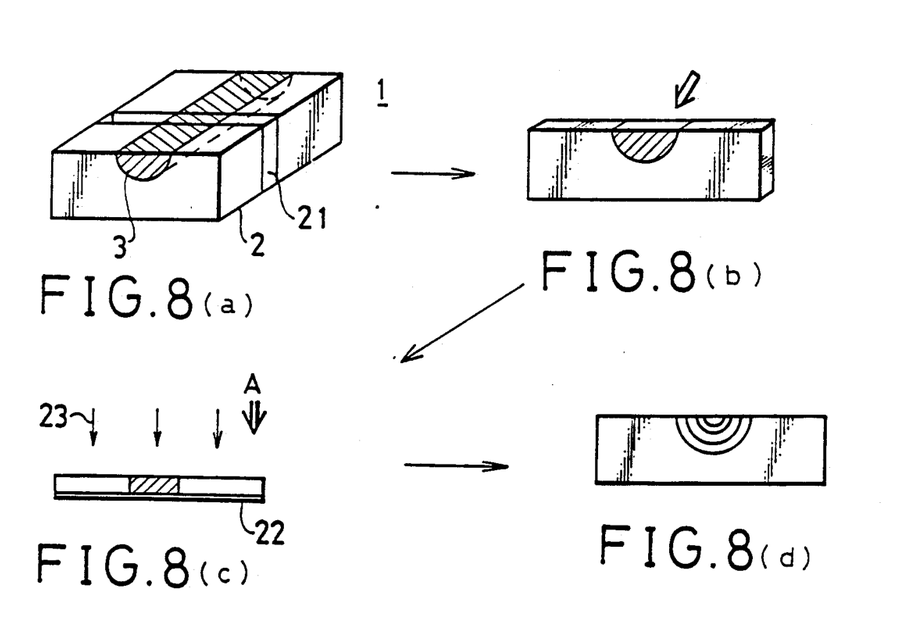
FIG. 8 is a diagram for illustrating the process of measuring the distribution of the refractive index of FIG. 7.

Referring next to FIG. 7, there is illustrated the results of measurement of distribution of the refractive index in the optical waveguide in the y-direction of FIG. 3. In this graph, the vertical axis represents the difference in the refractive index of the optical waveguide from that $n_o$ of part of the laser glass substrate 2 other than the optical waveguide 3; and the horizontal axis the depth from the top surface of the optical waveguide 3 (in $\mu$m). Referring to FIG. 8, the process of measuring the distribution of the refractive index of FIG. 7 will be described hereinbelow. First, as shown in FIG. 8 (a), a sample piece 21 is sliced off from the laser glass substrate 2 by cutting thereof in the direction perpendicular to the longitudinal direction of the optical waveguide 3. Next, as shown in FIG. 8 (b), Ag film 22 is formed on the surface of a side of this sample piece 21 by evaporation. Subsequently, as shown in FIG. 8 (c), the opposite side of the sample piece 21 is exposed to light 23 from a sodium lamp. Thus, as shown in FIG. 8 (d), interference fringes corresponding to the difference in the refractive index can be observed. Incidentally, FIG. 8 (d) illustrates the interference fringes observed from the direction indicated by an arrow A of FIG. 8

(c). Thereby, the difference in the refractive fringes can be obtained from the observed interference infringes.

Figure 9:
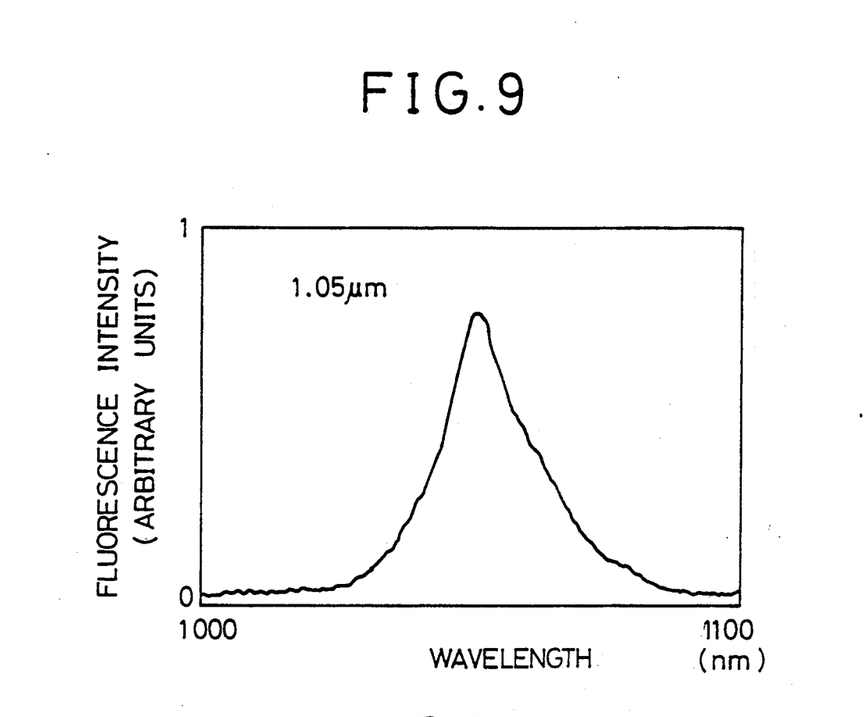
FIG. 9 is a graph for showing a fluorescence spectrum of the optical waveguide of the first embodiment of FIG. 1.
Figure 10:
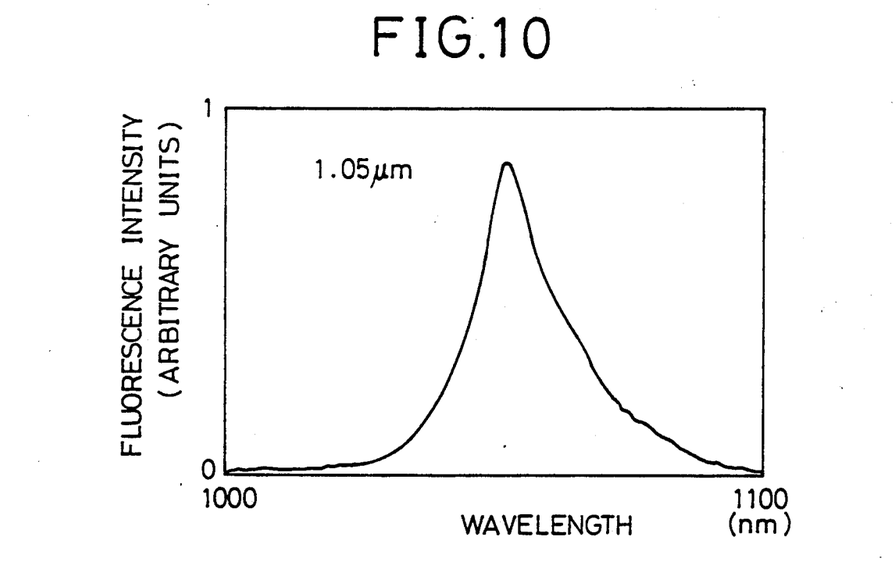
FIG. 10 is a graph for showing a fluorescence spectrum of the laser glass substrate of the first embodiment of FIG. 1 before the ion exchange is performed therein.

Referring next to FIG. 9, there is shown a measured fluorescence spectrum of the optical waveguide 3 of the first embodiment of FIG. 1. Further, referring to FIG. 10, there is a measured fluorescence spectrum of the laser glass substrate 2 of the first embodiment of FIG. 1 before the optical waveguide 3 is formed, i.e., before the ion exchange. In these figures, the vertical axis represents fluorescence intensity (in arbitrary units); and the horizontal axis wavelengths (in nano-meter (nm)). As is apparent from these figures, what is called peak wavelength (i.e., wavelength, at which the intensity is maximum), half-width, etc. of each of the fluorescence spectra are substantially unchanged before and after the ion exchange. This means that after the ion exchange is performed, the Ag ions do not have a substantial effect on energy levels of the neodymium ion.

Turning back to FIG. 1, the first highly reflecting mirror 4 is provided at one end of the optical waveguide 3, i.e., the end surface 2a of the laser glass substrate 2. This first highly reflecting mirror 4 transmits more than 85% of the pump light at pump wavelength=802 nm and reflects 99.9% of the laser oscillation light at lasing wavelength=1054 nm. As shown in FIG. 1, an end portion of the optical fiber 6 is connected to a part of the surface of a side of the mirror 4 opposite to a portion of the surface of the other side thereof connected to the optical waveguide 3. Further, the pump light $L_0$ which is emitted from the laser diode 8 and is focused by the lens 9 into the other end portion of the optical fiber 6, is led to the inside of the optical waveguide 3. Incidentally, what is called the central wavelength of the pump light emitted from the laser diode 8 is 802 nm.

Further, the optical fiber 6 is made of silica glass and has a core, of which the diameter is 80 $\mu$m, and a cladding of which the outside diameter is 125 $\mu$m.

Furthermore, as shown in FIG. 1, the second highly reflecting mirror 5 is provided at the other end of the optical waveguide 3, i.e., at the other end surface 2b of the laser glass substrate 2. This second highly reflecting mirror 5 transmits 0.3% of the laser oscillation light at lasing wavelength=1054 nm. Additionally, an end portion of the optical fiber 7 is connected to a part of the surface of a side of the mirror 5 opposite to a portion of the surface of the other side thereof connected to the optical waveguide 3. Further, the laser oscillation light $L_1$ is emitted from the other end portion (hereunder sometimes referred to as the emission end portion) of the optical fiber 7. Incidentally, the optical fiber 7 is also made of silica glass and has a core, of which the diameter is 80 $\mu$m, and a cladding of which the outside diameter radius is 125 $\mu$m.

Practically, light radiated from the other end portion of the optical fiber 7 includes not only the laser oscillation light $L_1$ but also the pump light $L_0$. In this embodiment, the light radiated from the emission end portion of the optical fiber 7 is led to the optical power meter 11 through the filter 10 which is used to remove the pump light $L_0$ therefrom. Thus, the intensity of the laser oscillation light $L_1$ can be measured by using the optical power meter 11.

Incidentally, the process of generating and emitting the laser oscillation light $L_1$ in this embodiment will be described hereinbelow. First, when the pump light $L_0$ radiated form the LD 8 is led to the inside of the optical waveguide 3 through the lens 9, the optical fiber 6 and the mirror 4, the neodymium (Nd) ions present in the inside of the optical waveguide 3 are excited. Then, light emitted due to the excitation of the neodymium ions repeatedly goes back and forth between the mirrors 4 and 5, resulting in generation of the laser oscillation light $L_1$. Thereafter, the thus generated laser oscillation light $L_1$ is radiated from the emission end portion of the optical fiber 7.

Figure 11:
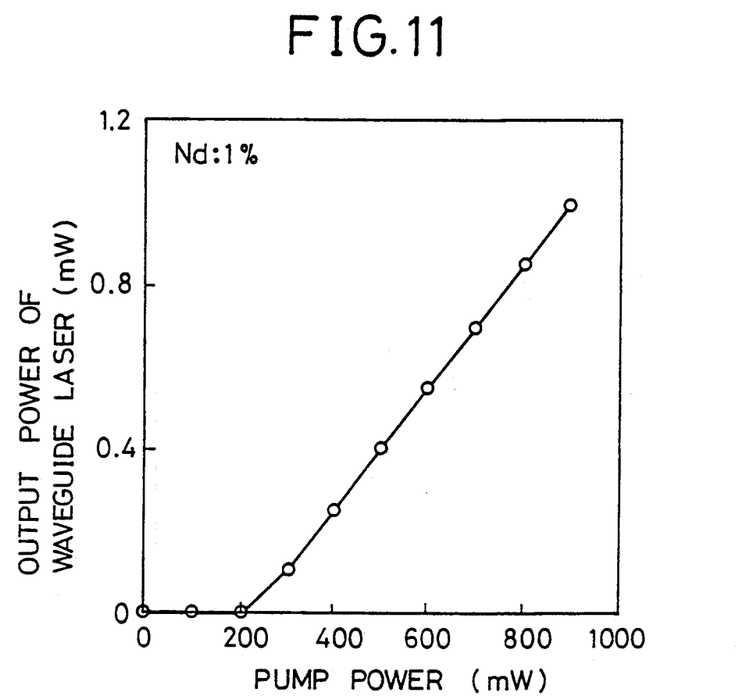
FIG. 11 is a graph for illustrating the results of actual measurement of output power of the waveguide laser of FIG. 1.

Referring to FIG. 11, there is shown the results of actual measurement of the intensity of the laser oscillation light generated in the waveguide laser of FIG. 1. Incidentally, the measurement of the intensity of the laser oscillation light is effected by using the optical power meter 11 of FIG. 1. Further, in FIG. 11, the horizontal axis represents the intensity of the pump light output from the LD 8, i.e., pump power (in milli-watt (mW)). On the other hand, the vertical axis represents the intensity of the laser oscillation light, i.e., output power of the waveguide laser (in mW).

As is seen from FIG. 11, the threshold value of the pump power is 200 mW; the maximum output power of the waveguide laser 1 mW (the corresponding pump power is 900 mW); and the efficiency of laser oscillation 0.14%.

Next, another preferred embodiment (hereunder sometimes referred to as a second embodiment) of the present invention will be described hereinbelow by referring to FIGS. 12 and 13.

The construction of the second embodiment is the same construction as that of the first embodiment described above, except that a laser glass substrate 2 of the second embodiment contains 3 wt. % of neodymium ions. Note that the laser glass substrate 2 of the first embodiment contains only 1 wt. % of neodymium ions. Therefore, the detailed description of the construction of the second embodiment will be omitted for simplicity of description.

Figure 12:
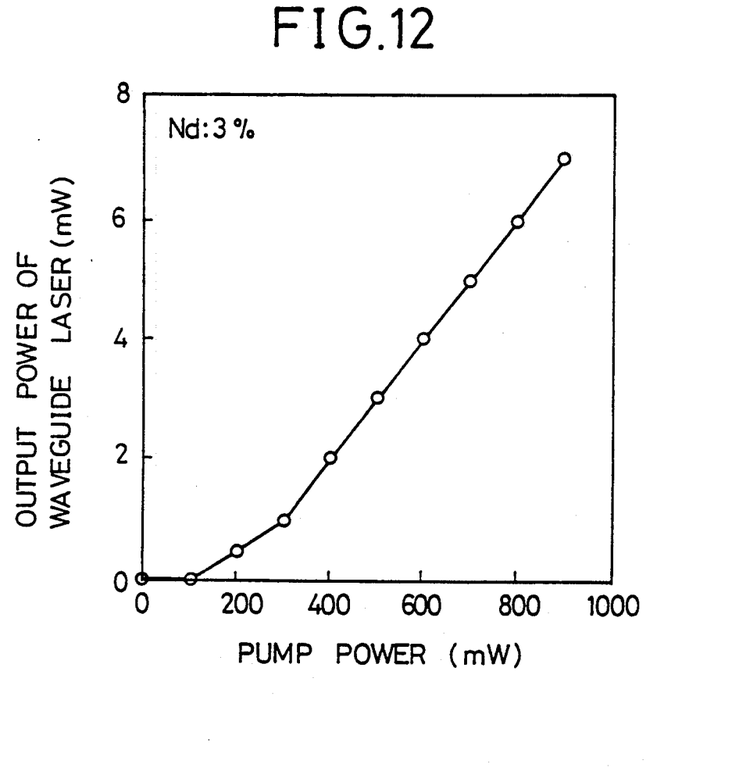
FIG. 12 is a graph for illustrating the results of actual measurement of output power of a waveguide laser in case of a second embodiment.

Referring now to FIG. 12, there is shown the results of actual measurement of the intensity of the laser oscillation light generated by using a waveguide laser similar to the waveguide laser of FIG. 1. Incidentally, the measurement of the intensity of the laser oscillation light is effected by using an optical power meter 11 as shown in FIG. 1. Further, in FIG. 12, the horizontal axis represents pump power in case of the second embodiment (in mW). On the other hand, the vertical axis represents output power of the waveguide laser power (in mW).

As is seen from FIG. 12, the threshold value of the output power of the waveguide laser is 100 mW; the maximum output power of the waveguide laser 7 mW (the corresponding pump power is 900 mW); and the efficiency of laser oscillation 0.88%.

Figure 13:
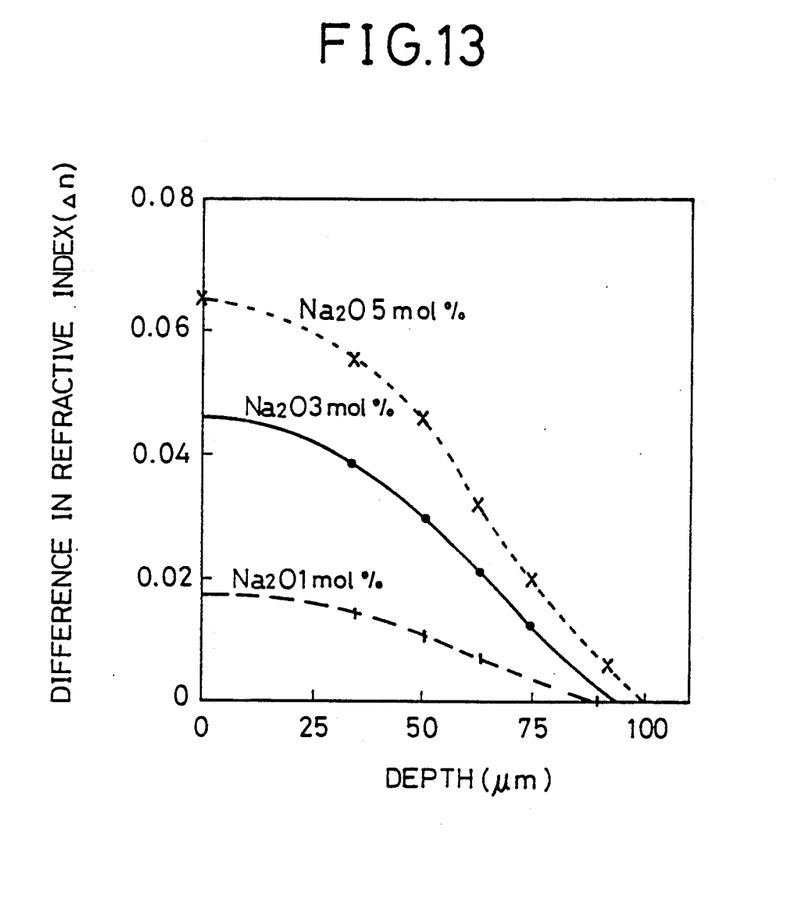
FIG. 13 is a graph for illustrating the results of measurement of the difference in refractive index between the optical waveguide 3 and the other portion of a laser glass substrate 2 of each of the first and second embodiments in case where the $Na_2O$ content of the substrate 2 is 1, 3 or 5 mol %.

Referring next to FIG. 13, there is shown the results of measurement of the difference in refractive index between the optical waveguide 3 and the other portion of a laser glass substrate 2 of each of the first and second embodiments in case where the Na$_2$O content of the substrate 2 is 1, 3 or 5 mol %. In FIG. 13, the horizontal axis represents the distance or depth from the surface of the laser glass substrate 2 in the y-direction illustrated in FIG. 3. On the other hand, the vertical axis represents the difference in refractive index between the optical waveguide 3 and the other portion of a laser glass substrate 2. As is apparent from FIG. 13, the more the substrate 2 contains Na$_2$O, the larger the difference in refractive index between the optical waveguide 3 and the other portion of the substrate 2 becomes. Further, the more the substrate 2 contains Na$_2$O, the better the convergency of incident light becomes. It is, however, confirmed that when the $Na_2O$ content of the substrate 2 exceeds 8 mol %, a crack or distortion may occur in the substrate 2 at the time of performing the ion exchange. Furthermore, it is also confirmed that when the $Na_2O$ content of the substrate 2 is less than 0.01 mol %, the difference in refractive index between the optical waveguide 3 and the other portion of the substrate 2 becomes too small for the optical waveguide 3 to fully function.

Next, a third embodiment of the present invention will be described in detail hereinbelow by referring to FIGS. 14 and 15.

As above stated, the first and second embodiments employ $Na^+$ ions as alkaline ions to be exchanged when an optical waveguide 3 is formed in a laser glass substrate 2, while the third embodiment employs $K^+$ ions as the alkaline ions. Further, the first and second embodiments employ $Ag^+$ ions as ions, for which the $Na^+$ ions are exchanged, while the third embodiment employs $Cs^+$ ions instead of $Ag^+$ ions. Except for such respects, the construction of the third embodiment is similar to that of the first or second embodiment as illustrated in FIGS. 1 and 2. Therefore, only the differences in construction and effects of the third embodiment from the first and second embodiments will be described hereinbelow.

First, principal composing compounds of the laser glass substrate 2 of the third embodiment and the mol % of them are as follows.

$P_2O_5$:60 mol %;
$Al_2O_3$:8 mol %;
BaO:12 mol %; and
$K_2O$:16 mol %.

As described above, in case of the third embodiment, $K^+$ ions derived from $K_2O$ contained in the laser glass substrate 2 are exchanged for $Cs^+$ ions in order to form the optical waveguide therein. Further, the third embodiment employs a CsCl film as a film to be deposited on a mask made of a Ti film and to be used in the ion exchange as a $Cs^+$ ion source.

Figure 14:
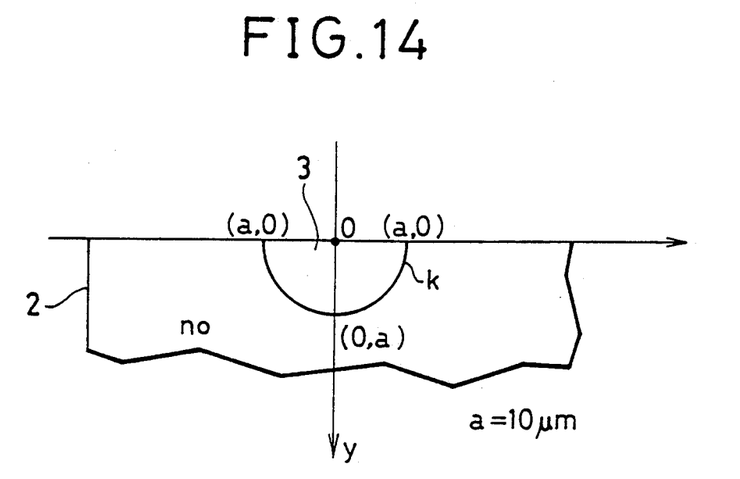
FIG. 14 is a cross-sectional view of an optical waveguide of a third embodiment.

Referring to FIG. 14, there is shown a cross-sectional view of an optical waveguide 3 of the third embodiment. Incidentally, the radius of the cross section of the optical waveguide 3 is 10 $\mu$m.

Figure 15:
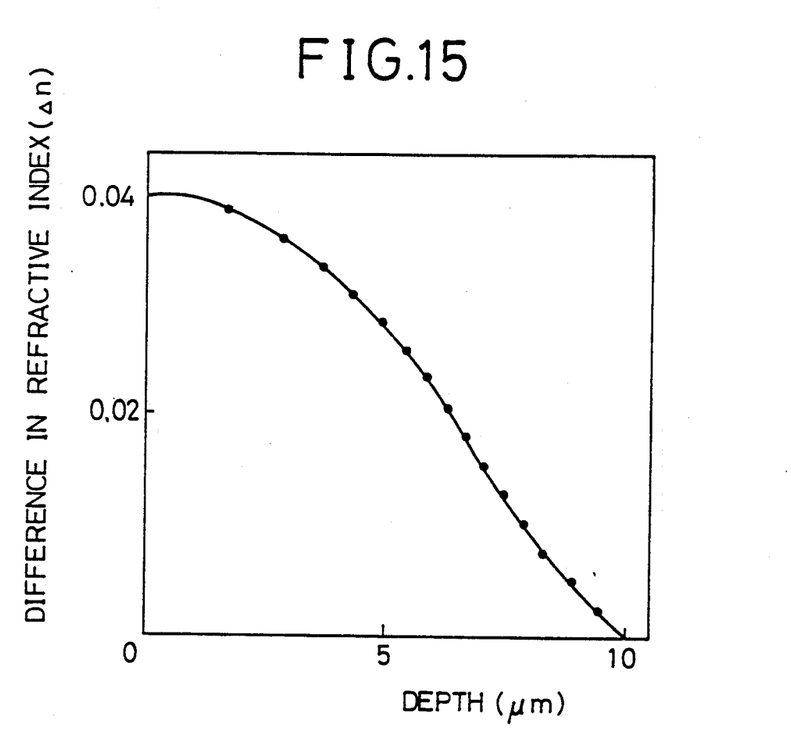
FIG. 15 is a graph for illustrating the results of measurement of the difference in refractive index between the optical waveguide and the other portion of a laser glass substrate 2 of the third embodiment in the y-direction of FIG. 14.

Referring next to a graph of FIG. 15, there is shown the results of measurement of the difference in refractive index between the optical waveguide and the other portion of the laser glass substrate 2 of the third embodiment in the y-direction of FIG. 14. As is seen from FIG. 15, the maximum difference in refractive index between the optical waveguide and the other portion of the laser glass substrate 2 of the third embodiment is 0.04. Similarly as in case of the first and second embodiments, the length of the optical waveguide 3 is 5 mm. Further, optical fibers each having a core, of which the diameter is 10 $\mu$m in accordance with the radius of the optical waveguide, and a cladding, of which the diameter is 125 $\mu$m, are employed as an optical fiber 6 for leading excitation light to an end of the optical waveguide 3 and another optical fiber 7 for guiding the laser oscillation light from the other end of the optical waveguide 3 to the outside thereof.

Furthermore, actual measurement of output power of the waveguide laser in case of the third embodiment is effected in the similar manner as in cases of the first and second embodiments. The results of the measurement are as follows: the threshold value of the output power of the waveguide laser is 30 mW; the maximum pump power 0.5 mW (the corresponding output power of the waveguide laser is 50 mW); and the efficiency of laser oscillation 2.5%.

While the preferred embodiments of the present invention have been described above, it is to be understood that the present invention is not limited thereto and that other modifications will be apparent to those skilled in the art without departing from the spirit of the invention. For instance, it is apparent to those skilled in the art that the laser medium according to the present invention, which is applied to a laser in the above described embodiments, can be applied to an optical amplifier.

The scope of the present invention, therefore, is to be determined solely by the appended claims.

We claim:

1. A waveguide laser medium having a laser glass substrate and an optical waveguide for effecting light amplification or laser oscillation, said laser glass substrate being made of laser glass containing alkaline ions and laser active ions, said optical waveguide being formed in a predetermined portion of said laser glass substrate and having a refractive index higher than the refractive index of the other portions of said laser glass substrate, said optical waveguide being formed by performing the ion exchange of the alkaline ions contained in the predetermined portion of said laser glass substrate for another kind of ions capable of operating to increase the refractive index of the laser glass, wherein said laser glass substrate is made of phosphate glass containing neodymium ions as the laser active ions and further containing 0.01~8.0 mol % of $Na_2O$, from which $Na^+$ ions are obtained as the alkaline ions, and the ions operating to increase the refractive index of the predetermined portion are $Ag^+$ ions.

2. A waveguide laser medium having a laser glass substrate and an optical waveguide for effecting light amplification or laser oscillation, said laser glass substrate being made of laser glass containing alkaline ions and laser active ions, said optical waveguide being formed in a predetermined portion of said laser glass substrate and having a refractive index higher than the refractive index of the other portions of said laser glass substrate, said optical waveguide being formed by performing the ion exchange of the alkaline ions contained in the predetermined portion of said laser glass substrate for another kind of ions capable of operating to increase the refractive index of the laser glass, wherein the laser glass substrate is made of phosphate glass containing neodymium ions as the laser active ions and further containing 0.01~18.0 mol % of $K_2O$, from which $K^+$ ions are obtained as the alkaline ions, and the ions operating to increase the refractive index of the predetermined portion are $Cs^+$ ions.

3. A waveguide laser medium as set forth in claim 1, wherein said laser glass substrate is made of phosphate glass containing 35.0~75.0 mol % of $P_2O_5$.

4. A waveguide laser medium as set forth in claim 1, wherein said laser glass substrate is made of phosphate glass containing 0.05~8.0 wt. % of the neodymium ion.

5. A waveguide laser medium as set forth in claim 3, wherein said laser glass substrate is made of phosphate glass containing 0.05~8.0 wt. % of the neodymium ion.

6. A waveguide laser having a pump source and a waveguide laser medium according to claim 1, wherein light amplification or laser oscillation is effected by leading pump light emitted from said pump source to said waveguide laser medium.

7. A waveguide laser as set forth in claim 6, wherein said laser glass substrate is made of phosphate glass containing 35.0~75.0 mol % of $P_2O_5$.

8. A waveguide laser as set forth in claim 6, wherein said laser glass substrate is made of phosphate glass containing 0.05~8.0 wt. % of the neodymium ion.

9. A waveguide laser as set forth in claim 7, wherein said laser glass substrate is made of phosphate glass containing 0.05~8.0 wt. % of the neodymium ion.

10. A waveguide laser medium as set forth in claim 2, wherein said laser glass substrate is made of phosphate glass containing 35.0 75.0 mol % of $P_2O_5$.

11. A waveguide laser medium as set forth in claim 2, wherein said laser glass substrate is made of phosphate glass containing 0.05~8.0 wt. % of the neodymium ion.

12. A waveguide laser having a pump source and a waveguide laser medium according to claim 2, wherein light amplification or laser oscillation is effected by leading pump light emitted from said pump source to said waveguide laser medium.

* * * * *